Aug. 26, 1958 R. W. TRIPP 2,849,668
AUTOMATIC MACHINE CONTROL
Filed Oct. 14, 1955 10 Sheets-Sheet 2

ROBERT W. TRIPP,
INVENTOR.

BY *W E Beatty*

ATTORNEY.

Aug. 26, 1958 R. W. TRIPP 2,849,668
AUTOMATIC MACHINE CONTROL
Filed Oct. 14, 1955 10 Sheets-Sheet 4

ROBERT W. TRIPP,
INVENTOR.

BY W. E. Beatty

ATTORNEY.

Aug. 26, 1958

R. W. TRIPP 2,849,668

AUTOMATIC MACHINE CONTROL

Filed Oct. 14, 1955

ROBERT W. TRIPP,
INVENTOR.

BY *W. E. Beatty*

ATTORNEY.

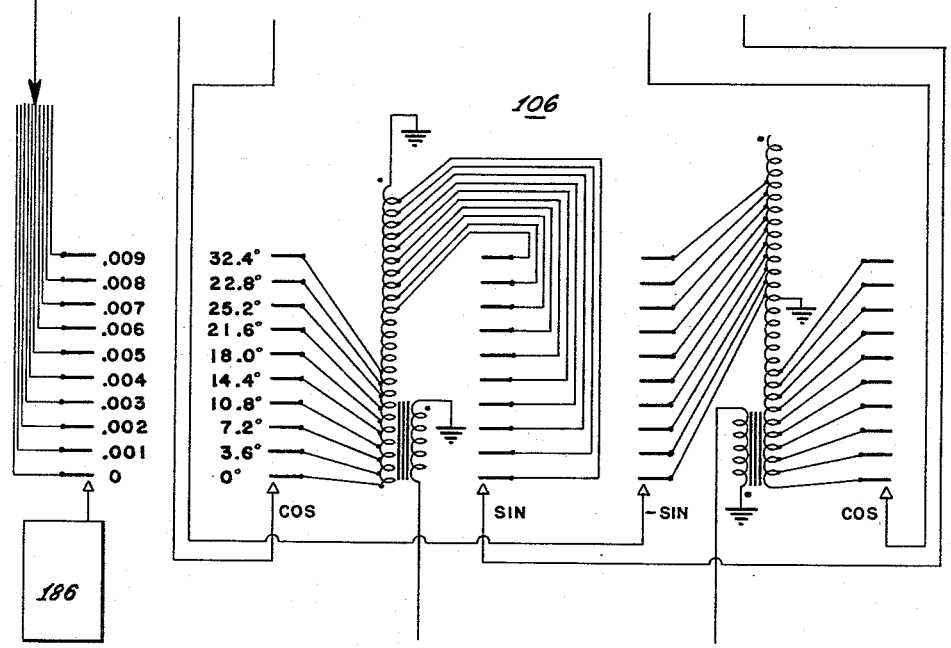

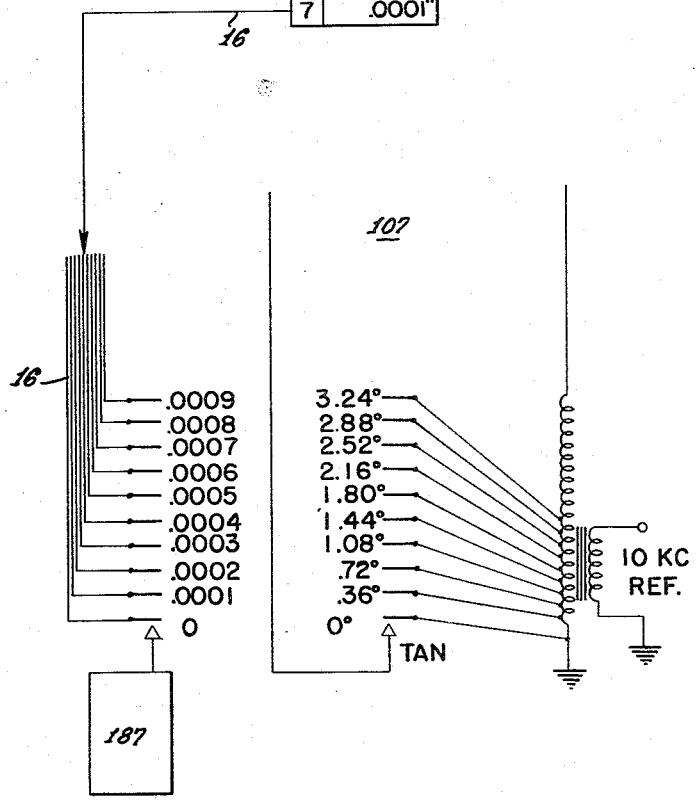

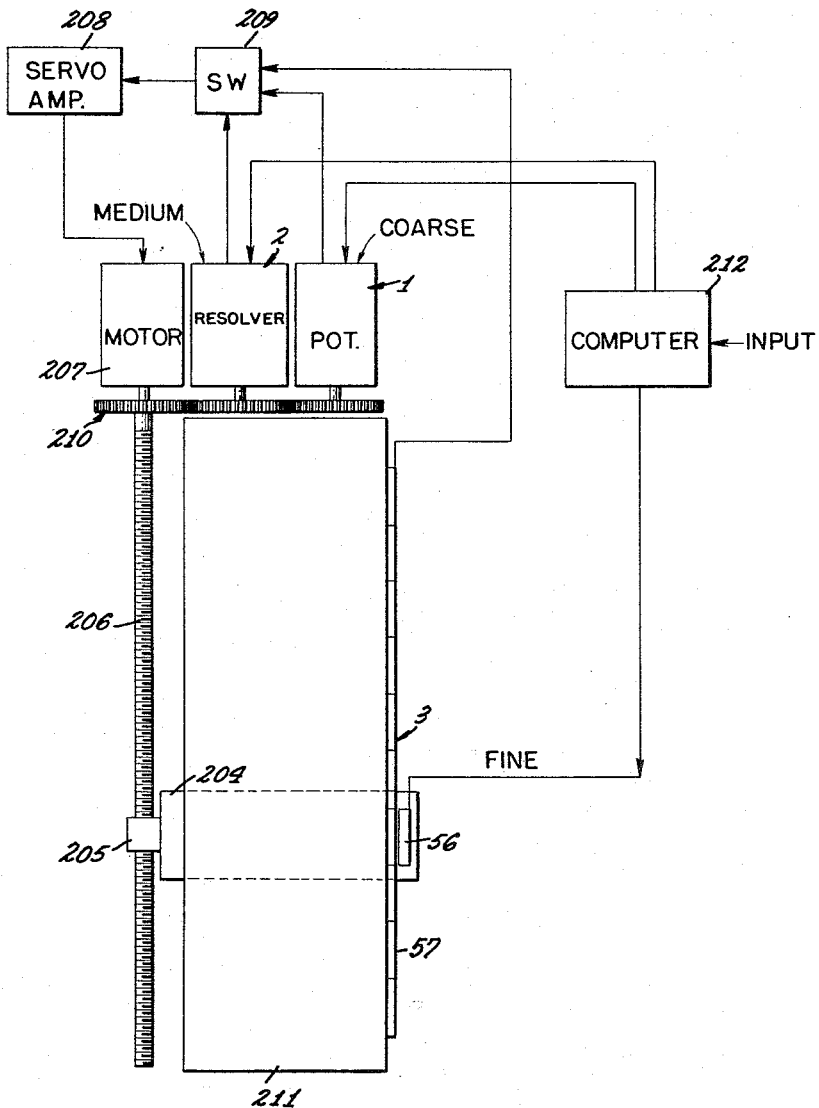

United States Patent Office 2,849,668
Patented Aug. 26, 1958

2,849,668

AUTOMATIC MACHINE CONTROL

Robert W. Tripp, Bronxville, N. Y., assignor, by mesne assignments, to Inductosyn Corporation, Carson City, Nev., a corporation of Nevada Application October 14, 1955, Serial No. 540,429

7 Claims. (Cl. 318—28)

This invention relates to a digital-to-analog converter which will accept digital input information on a decimal or other basis in terms of a desired extent of travel of a driven element such as a machine element or tool, with a converter for producing corresponding analog voltages representing the desired travel of the driven element. More particularly the invention relates to a digital-to-analog converter for employing linear input information and for producing signals of voltages representing linear position of a rectilinearly movable driven element.

An object of the invention is to provide a digital-to-analog converter for not only a large range of values or travel but also for very high accuracy.

Another object is to provide a control wherein the range of movement of the driven element such as a machine slide, may be of the order of hundreds of inches and with a precision of the order of .0001 inch.

A further object of the invention is to provide input information in the form of a perforated card or the like which may be employed to provide a wide range of analog voltages, without subjecting the card to such analog voltages.

It is known to provide error signals having coarse and medium values, with a voltage control to shift from one to the other. The operation of data elements in different ranges or at different speeds, with a switch to connect the servo-motor and amplifier to one or another of such data elements, is described in the following publications:

Radiation Laboratory Series, volume 17, "Components Handbook," Blackburn, published 1949 by McGraw-Hill Book Co., page 327.

Volume 21 of the above series: "Electronic Instruments," Greenwood et al., published 1948, pages 372 to 375.

Volume 25 of the above series: "Theory of Servo-Mechanisms," James et al., published 1947, pages 81 to 88.

Such control forms no part of the present invention, but may be employed here in connection with any usual type of servo or other system requiring analog information.

Another object of the invention is to provide a control system wherein coarse, medium and fine data elements are provided to obtain a large range of values with high accuracy and wherein entirely different types of data elements are employed for producing the coarse, medium and fine signals, the use of a potentiometer, a rotary position measuring transformer and a linear position measuring transformer being illustrated for use respectively as these data elements. A feature of the invention relates to overlapping the operation of these different types of data elements.

The invention illustrates that the input information may be established on a decimal (or similar) basis in terms of the distance that the driven element such as a machine slide is to be driven. This distance may be set up in terms of hundreds of inches, to the nearest .0001 in., namely, 7 decimal digits. Cards are punched with this information in seven columns. A card reader controls stepping switches which adjust the potential of transformers to apply the control voltages to each of the three data elements. A push button control may be used instead of a card. The servo system then drives in such a direction as to decrease the error signal at the coarse data element. When this signal reaches a sufficiently low value, as well known, being described in the above publications, the servo amplifier automatically switches to the error signal from the medium data element and in like manner when the medium error signal reaches a sufficiently low value, the circuit automatically switches to the fine error signal and the servo motor proceeds to drive until it has nulled the error signal.

Since a complete cycle of the medium data element is taken as 10 inches, the coarse data element must bring the machine well within this distance from the final desired position before it can let the medium data element take control. The maximum error that could be tolerated would be ½ cycle of the next finer data element or in this case, 5 inches. However, as a practical value these circuits are usually designed with the coarse data element having an accuracy about equal to $\frac{1}{10}$ of the cycle of the next finer element and the switch circuit is adjusted to operate at about ¼ cycle of the same element. This means that the coarse data element must have an accuracy of about 1 inch in a thousand, the medium data element must have an accuracy of about .01 inch in 10 while the fine data element has an accuracy of .0001 inch in .10 inch. The rotor of the medium data element thus makes 1 revolution per 10 inches and the cycle of the fine element is 0.1 inch. Thus the percentage accuracy of each data element is about the same or 1 part in 1000.

The medium data element may be a conventional 2 pole resolver or a position measuring transformer of the type described and claimed in patent application S. N. 536,464, filed Sept. 26, 1955, by R. W. Tripp, the fine data element being preferably a linear position measuring transformer described and claimed in patent application S. N. 509,168, filed May 18, 1955, by R. W. Tripp and J. L. Winget, now Patent No. 2,799,835, both cases being assigned to the assignee of the present application.

Such transformers may comprise two inductively related members movable with respect to each other, one fastened to each of the machine elements whose relative positions or motions are to be controlled. One member bears a continuous winding in the form of a multiplicity of conductors disposed in a plane parallel to the direction of relative motion of the members, the conductors extending transversely of that direction. The conductors are connected into a single series circuit so that adjacent portions carry current in opposite directions transversely of the length of the array. The second member bears two windings similar to the winding of the first member but usually shorter and disposed with respect to each other in space quadrature of the cycle defined on the continuous winding of the first member by the separation, center to center, of three adjacent conductors of that winding, the separation being taken in the direction of relative motion of the two members. The members are supported for relative motion with their windings at a small and constant separation, and the design of the windings is preferably such that the voltage induced in any of them by a current in a winding of the other member is a substantially sinusoidal function of the relative position of the members, cyclical in a change of relative position of the members equal to this pole cycle.

A further object of the invention is to provide a digital-to-analog converter where a relatively large number of digital groups may be used and the influence of one digital group upon another is reduced to a negligible amount without the need for employing bridging amplifiers and without entailing the attenuation of resistance networks.

A further feature of the invention relates to a digital-to-analog converter for representing a shaft position, wherein the analog information is in terms of the sine and cosine of the angular shaft position. If we have a stage of equal resistances of value 10R in each step and another stage wherein each step has a value of 1R, with ten steps in each set of resistances, it is possible to obtain 100 different values by simple addition. In the case of trigonometric functions however, $$\sin (a+b) = \sin a \cos b + \cos a \sin b \quad (1)$$
$$\cos (a+b) = \cos a \cos b - \sin a \sin b \quad (2)$$

An object of the invention is to provide a circuit which will solve the above equations in the case where the angle ($a$) is provided in discreet steps, the angle ($b$) also in discreet steps such as from zero to nine, with a decimal or similar relation between the two steps. While the above equations can be solved by connecting electrical resolvers in tandem and operating at different speeds, such arrangement would entail the difficulty of accurately positioning the rotors of the resolvers at the desired steps. The present invention has the advantage of avoiding that problem through the use of conventional rotary switches which readily lend themselves for use in a system wherein the input data is supplied in digital form. In the above equations, voltages corresponding to the product terms are obtained by means of transformers. one value such as sin ($a$) being supplied as a voltage to the primary of the transformer, the other value such as cos ($b$) being obtained by a suitable tap at the secondary of that transformer. The plus and minus values are obtained by appropriate selection of leads.

As a further simplification, resulting in fewer switch contacts, it is recognized that the resolver error signal depends on the ratio of sin ($b$) to cos ($b$), not on their absolute values.

Dividing the right hand side of each of the above Equations 1 and 2 by cos ($b$) results in the following expressions respectively:

$$\tan b \cos a + \sin a \quad (3)$$
$$\cos a - \tan b \sin a \quad (4)$$

The invention also provides for obtaining various values of voltages in accordance with the trigonometric function of the angular shaft position in accordance with the ratio of sine to cosine as defined in Equations 3 and 4. This is used for certain digits where the corresponding vector angle of the resolver is small.

For further details of the invention, reference may be made to the drawings wherein:

Fig. 7 is a schematic drawing of the stepping switch actuated by the "hundredths" information for both the medium data and fine data elements.

Fig. 8 is a schematic circuit of the stepping switch which receives the "thousandths" digital input information for the fine data element.

Fig. 9 is a schematic circuit of a stepping switch which accepts the "ten thousandths" input to supply appropriate voltages to the fine data element.

Fig. 10 is a schematic plan view of a machine element driven by a motor operated by a servo amplifier controlled by coarse, medium and fine data elements having a digital input according to the present invention.

Figure 1:
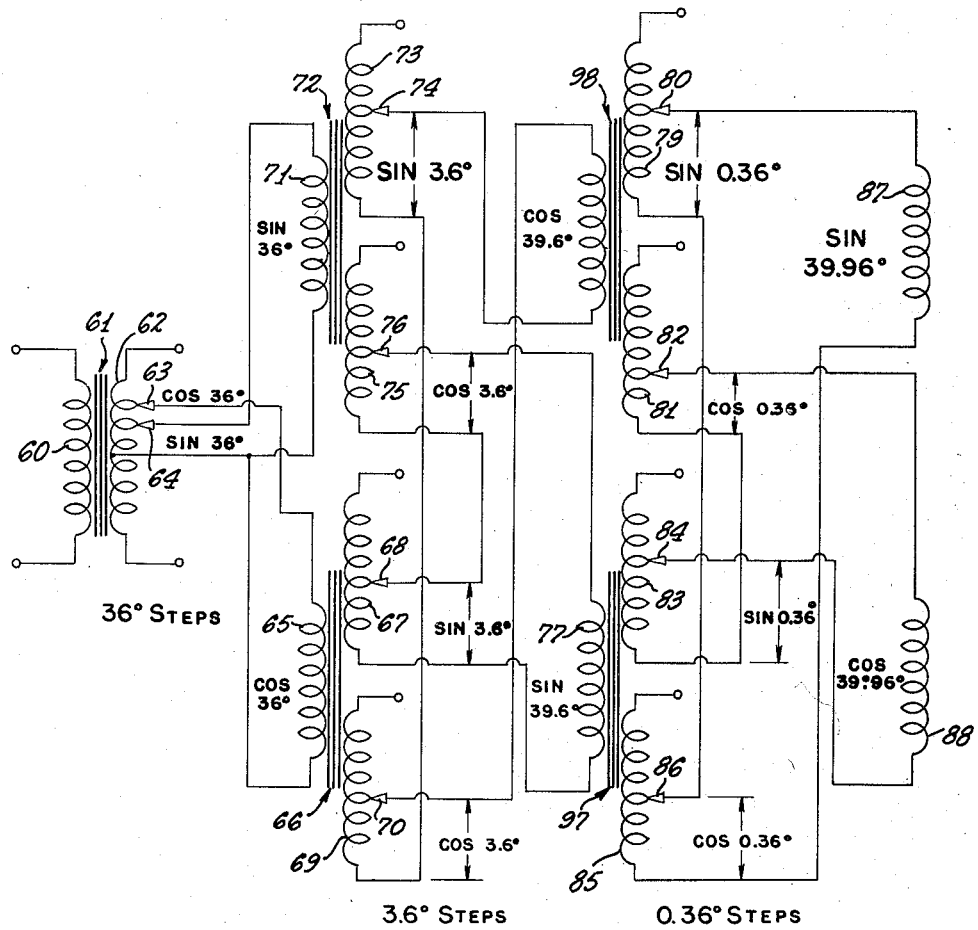
Fig. 1 is a schematic circuit for computing voltages proportional to the sine and also to the cosine of the sums of two angles.

Referring in detail to the drawings, the machine slide indicated at 204 in Fig. 10, has a nut 205, driven by a lead screw 206, driven by a motor 207. The motor 207 is controlled by means of voltages derived from a coarse data element 1, a medium data element 2 (see Figs. 5 and 10) and a fine data element 3 (see Figs. 7 and 10). As above described, the voltages derived from the data elements 1, 2, and 3 may be applied to a servo amplifier 208 (see Fig. 10) which controls the motor 207, with transfer from one of these data elements to the other by switches indicated at 209 as above described. The slider 40, of the coarse data potentiometer 1, and the rotor 53, of the medium data resolver 2 (see Fig. 5) are geared to the motor 207 by gearing indicated at 210 in Fig. 10. The medium data resolver 2, shown in Fig. 5 has quadrature windings 50 and 51. The fine data element 3 (see Figs. 7 and 10) has a slider 56 having quadrature windings 54 and 55, and inductively related thereto is a stationary scale 57, having a continuous winding 58. The scale 57 as shown in Fig. 10 is supplied in sufficient quantity to accommodate the full length of travel of the machine element 204, being here illustrated as extending the full length of the bed 211 of the machine and fixed to a stationary part of the machine, while the slider 56 is fixed to and carried by the movable machine slide 204. In Fig. 10, the computer block indicated at 212 generally represents the digital-to-analog converter shown in detail in the other figures.

The input data for the data elements 1, 2 and 3 is derived from a suitable input such as a card, not shown, having 7 columns of perforations which are read by a suitable reader, the input from the card reader being indicated at 4 in Figs. 4, 5, 6, 7, 8, and 9. As shown, the input from the card reader contains voltages or not, in each of the columns corresponding to the seven digits indicated. The cable 10 from the input column marked 1 for the "hundreds" value in inches of the linear position of the machine slide 204, controls the stepping switch 101 in accordance with the coarse data or hundred's digit, of the linear position to which the machine slide 204 is to be driven. The cable 11 from the column marked 2 of the input 4 controls the stepping switch 102 in accordance with the "tens" of inches information on the card, this also being coarse data, namely, the ten's digit of linear position. The cable 12 from the column indicated at 3 of the input 4 controls the switch 103 in accordance with the "units" of inches, this being both the coarse and medium data information, namely, the unit's digit of linear position.

Figure 5:
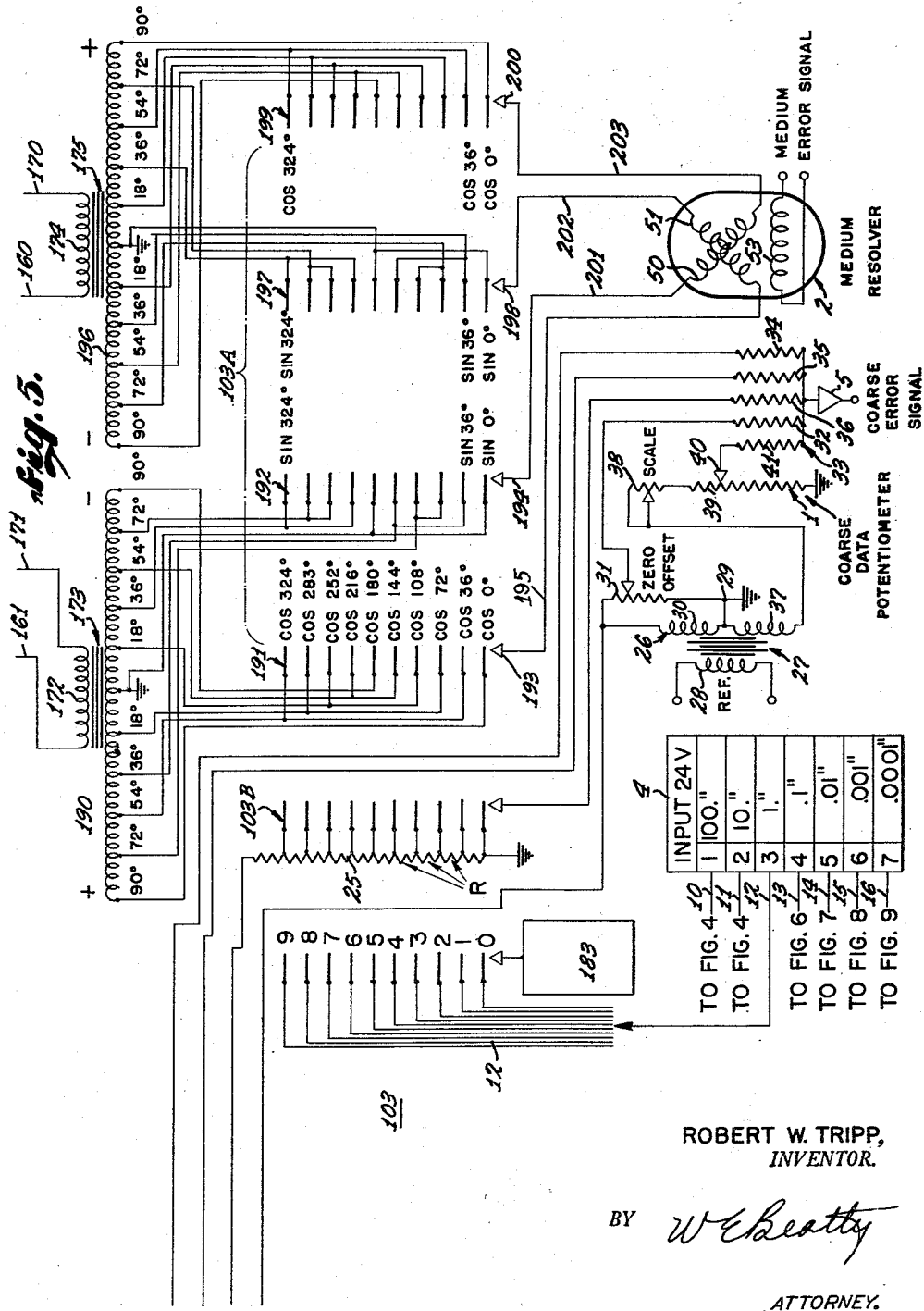
Fig. 5 is a schematic circuit illustrating the stepping switch actuated by the units value of the input to operate both the coarse data potentiometer and the medium data resolver, to overlap their operation.

The output from the switches 101, 102 and from contact bank 103B of switch 103 is fed through the amplifier 5, Fig. 5, to form the coarse error signal for controlling motor 207.

It will be noted that the switch 103 in Fig. 5 also includes contacts 103A which leads to the medium data element 2, to overlap the coarse and medium data at the units digit.

Figure 6:
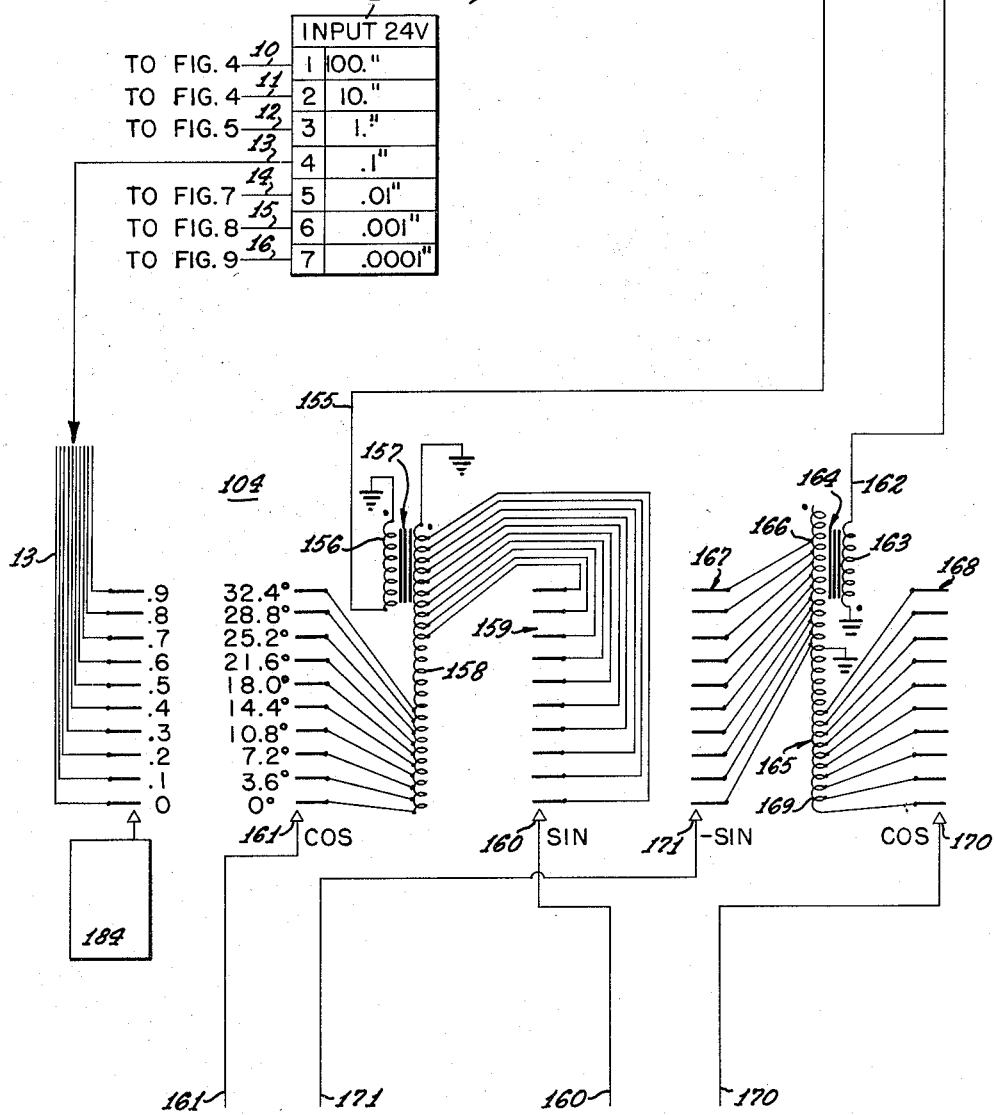
Fig. 6 is a schematic circuit of the stepping switch which responds to the "tenths" input to supply potentials for the medium resolver.

The cable 13 from the column 4 of the input 4 controls the switch 104 in Fig. 6 in accordance with the linear input information ranging from 0 to .9 inch in steps of .1 inch. The cable 14 from the column 5 of the input 4 controls the switch 105 in Fig. 7 in accordance with the input data ranging from 0 to .09 inch in steps of .01 inch.

The switches 103A, 104 and contacts 105B of switch 105 control the potentials applied to the medium data element 2.

The cable 15 from column 6 of input 4 controls the switch 106 in Fig. 8 in accordance with the linear information ranging from 0 to .009 inch in steps of .001 inch. Cable 16 leading from the column marked 7 of the input 4, controls the switch 107 in Fig. 9 in accordance with the input information ranging from 0 to .0009 inch in steps of .0001 inch.

Switch 105 overlaps the medium and fine control and it controls the switch contacts 105A which lead to the fine data element 3. This data element 3 also is controlled by the voltages established by the switches 106 and 107.

Each of the switches and switch contacts above described are arranged on a decimal basis in steps of 10, although some other number base may be used. Also, each of the switches 101 to 107 inclusive is a rotary stepping switch of the type indicated in connection with switch 101. Also, each of the cables 10 to 16 in fact includes 10 lines, one for each step on its associated switch, and each of the blocks indicated at 1 to 7 in the input 4 likewise includes 10 columns for the presence or absence of a hole, so that each thereof controls one of the circuits in the cables in question. For example, the cable 10 in fact includes 10 lines, one for each of the steps from zero to 900 as indicated. If the coarse data on the card calls for a linear movement of 300 inches, a hole in the corresponding column on the card results in the card reader putting a potential on the line in cable 10 leading to the contact 17 (Fig. 4) corresponding to this value, whereupon the stepping magnet 18 of the conventional rotary switch 101 advances its wiper 19 to the contact 17 to thereby advance the wiper 20 to the corresponding contact 21 of a potentiometer or voltage divider 22 wherein the resistances are arranged in equal steps of value 100R. In like manner, the switch 102 has a voltage divider 24 wherein 10 units of resistance are employed in each of the ten steps while switch 103 has a voltage divider 25 wherein one unit of resistance is used on each step.

A stepping magnet similar to magnet 18 as indicated for switch 101 is used for each of the other switches, being indicated at 182 for switch 102, at 183 for switch 103, at 184 for switch 104, at 185 for switch 105, at 186 for switch 106 and at 187 for switch 107.

The stepping switches 101 to 107 are caused to take a position corresponding to that of the hole in the card. The auxiliary relays like 42 and the stepping coils like 43 are wired so that the stepping switch steps continuously by alternately making and breaking its energizing circuit until it reaches the contact that is energized by the punched card at which time the relay like 42 breaks the circuit to the stepping coil like 43 and the stepping switch stops. At the end of this operation, the 24 volt supply can be removed from the stepping switch circuit and the switches 101 to 107 will stay in that position when the card is removed.

The voltage dividers 22, 24 and 25 are in circuit with the secondary winding 26 of the transformer 27 (Fig. 5) having a primary winding 28 connected to a suitable source not shown, which may be 60 cycles or 10 kc. Winding 26 has a midtap 29 to ground. One portion 30 of this winding is shunted by a variable resistance 31 which can be varied to adjust the zero offset, this circuit leading to a resistance 32 of a mixing resistance 33. The voltage divider 22 is in circuit with the mixing resistance 34, voltage divider 24 is in circuit with mixing resistance 35, and voltage divider 25 is in circuit with the mixing resistance 36. In circuit with the other portion 37 of winding 26 is a variable resistance 38 and a coarse data potentiometer 39 having a slider 40 in circuit with the mixer resistance 41. The coarse data potentiometer 39 may be helical and is geared to the machine to be controlled as above described, being excited from the winding 37 in opposite phase to the winding 30 which supplies the voltage dividers 22, 24 and 25. The output from the potentiometer 39 is applied through the resistance 41 to the amplifier 5. When the slider 40 of the potentiometer 39 is in the desired and correct position, the output from the coarse error amplifier 5 will be 0. The zero offset potentiometer 31 and the scale potentiometer 38 are used for initial adjustment to make the electrical zero of the circuit correspond to the desired mechanical zero of the machine and to make the scale of the potentiometer correspond to the desired scale of the machine and the other data elements.

The medium data element 2, is a rotary position measuring transformer as described above, and includes quadrature windings 50 and 51 (Fig. 5) and a rotary winding 53 which assumes a position in accordance with the sine and cosine functions supplied to the windings 50 and 51. That is, the currents supplied to the windings 50 and 51 are sine and cosine functions of the distances to be travelled by the machine. This medium data element 2 repeats its cycle of operation for each 10 inches of linear motion of the machine. The rotor 53 is geared to the driven machine element as above described.

The overlap of the coarse data element 1, which is controlled by potentiometer 39, with the medium data element 2, which is rotary and varies in accordance with a trigonometric function of the current applied to it, is accomplished according to the invention by providing the switch 103 not only with the voltage divider 25 having steps which vary as a linear function of the units of distance but also with the corresponding bank of switch contacts 103A to provide input voltages which correspond to the sine and cosine functions of the machine distance, such functions repeating for each 10 inches of motion of the machine in accordance with the corresponding cycle of operation of the medium data element 2.

Fig. 1 illustrates the electrical equivalent of the arrangement used in connection with the medium data element 2 and also with the fine data element 3, the problem being to supply to each thereof sine and cosine values according to the sums of certain angles as called for by the input data, bearing in mind that in the example shown, the medium data element 2 is controlled by three digits as indicated, while the fine data element 3 is controlled by three other digits. In Figure 1, the primary winding 60 of transformer 61 is supplied with current from a suitable source not shown, the secondary winding 62 having a series of ten taps indicated at 63, to pick off voltage values in proportion to the cosine, in 36 degree steps. The tap 64 picks off sine values in 36 degree steps. The cosine value of current is supplied to the primary winding 65 of a transformer 66 having two secondary windings of which one winding 67 has ten taps as indicated at 68 to pick off sine values in steps of 3.6 degrees, while the other secondary 69 has ten taps as indicated at 70 to pick off cosine values in steps of 3.6 degrees.

The voltage value corresponding to sine 36 degrees from tap 64 is supplied to the primary winding 71 of the transformer 72 having a secondary winding 73 having ten taps as indicated at 74 to pick off sine values in steps of 3.6 degrees. Transformer 72 has another secondary winding 75 having ten similar taps as indicated in 76 in steps of cosine 3.6 degrees.

Referring to the Formulae 1 and 2 given above for the sine of the sum of two angles, it will be apparent that each of the transformers 66 and 72 effects multiplication of the cosine and sine value respectively of the angle 36 degrees, with the sine and cosine of 3.6 degrees. In the example chosen, nine other values for each of these angles are possible if each of the switches in question has ten steps. Hence primary winding 77 of transformer 97 is supplied with current proportional to the sine of a selected multiple of 36 degrees, as selected by the tap 64, plus the selected multiple of 3.6 degrees as selected by taps 68 and 74, or the sine of 39.6 degrees equals the product of sine of 36 degrees and cosine of 3.6 degrees as supplied by winding 75, plus the product of cosine 36 degrees and sine 3.6 degrees as supplied by winding 67 assuming that the multiple in each case is unity. In a similar way, current proportional to the cosine of 39.6 degrees, namely, the sum of the two angles chosen by way of example, is supplied to primary winding 78 of transformer 98, product of cosine 36 degrees and cosine 3.6 degrees being supplied by winding 69, while the product of sine 36 degrees and sine 3.6 degrees is supplied by winding 73, with suitable reversal of leads to account for the negative sign for the product sina sinb.

In a similar way, the sine and cosine values thus obtained may be used as inputs to transformers 97 and 98 to obtain sine and cosine values carried out to another digit. In the example shown, the primary winding 78 has a secondary winding 79 having ten taps as indicated at 80 which vary in steps of sine 0.36 degree, also having another secondary winding 81 having ten taps indicated at 82 which vary in steps of cosine 0.36 degree. Similarly, transformer primary 77 has a secondary winding 83 having ten taps indicated at 84 which vary in steps of sine 0.36 degree, having another secondary winding 85 having ten taps 86 which vary in steps of cosine 0.36 degree.

From the preceding description it will be apparent that the winding 87 is supplied with current corresponding to the value of sine 39.96 degrees, namely the sine of the sums of three angles $x36+y3.6+z0.36$ where $x$, $y$ and $z$ are any integer from 0 to 9, being each unity in the example, while winding 88 is supplied with current corresponding to the cosine of the sums of those three angles, e. g., 39.96 degrees. The windings 87 and 88 represent the quadrature windings 50 and 51 of the medium resolver 53, and also represent the quadrature windings 54 and 55 of the slider 56 of the fine data element 3.

Figure 2:
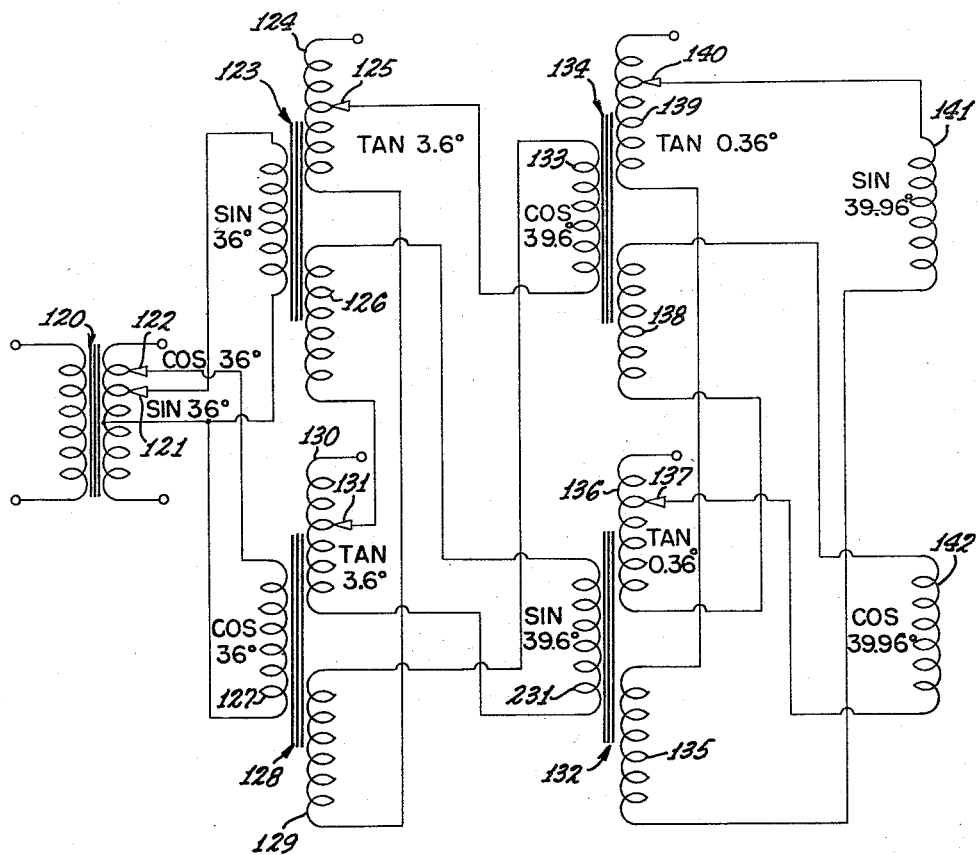
Fig. 2 is a schematic circuit similar to Fig. 1, but in modified form employing fewer switch contacts.
Figure 3:
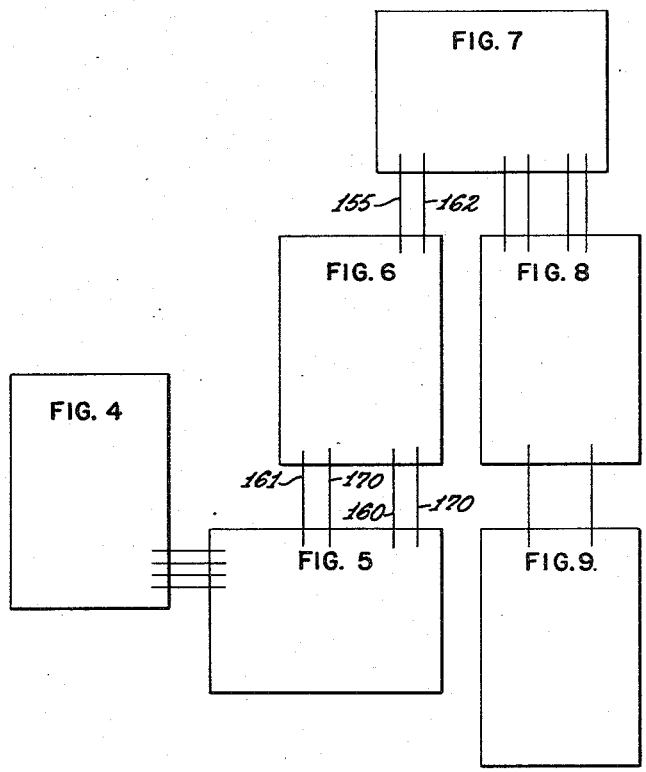
Fig. 3 is a schematic key circuit showing how Figs. 4 to 9, inclusive, fit together to illustrate a complete digital to analog converter according to the present invention.
Figure 4:
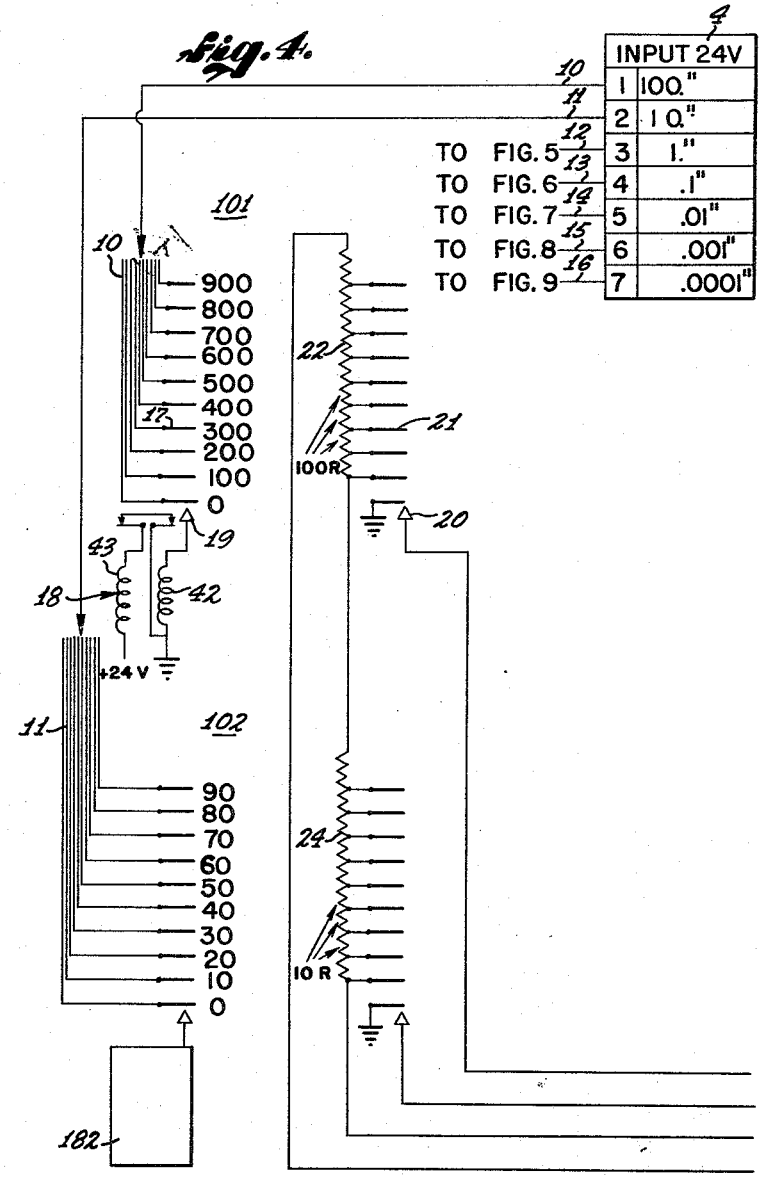
Fig. 4 is a schematic circuit illustrating the stepping switches for controlling the hundreds and tens voltage values of the coarse data element.

A transformer digital-to-analog converter employing fewer switches and operating in accordance with Equations 3 and 4 is illustrated in Fig. 2 wherein transformer 120 corresponds to transformer 61, and similarly has ten taps indicated at 121 to supply voltage values corresponding to sine 36 degrees and similar taps 122 to supply voltage values corresponding to cos 36 degrees respectively, in 36 degree steps. The voltage value corresponding to sine 36 degrees is supplied to a transformer 123 having a secondary winding 124 having ten taps as indicated at 125 in terms of tan 3.6 degrees, in 3.6 degree steps. Transformer 123 has another secondary winding 126 having no taps, to supply a signal value corresponding to sine $(b)$ as it appears in above Equation 3, namely sine 36° in the example here given.

Voltage values corresponding to the selected multiple of cos 36 degrees is supplied to primary winding 127 of transformer 128 which has a secondary winding 129 with no taps to supply a signal value of cos 36° corresponding to cos $(b)$ in Equation 4. Transformer 128 also has a secondary winding 130 having ten taps indicated at 131 to pick off a selected multiple of tan 3.6 degrees.

From the above explanation, it will be apparent that the voltage corresponding to tan $(a)$ cos $(b)$ in Equation 3 is picked off by winding 130. Assuming that the angle $(b)$ is 36 degrees as indicated, and that the angle $(a)$ is 3.6 degrees, the winding 124 picks off a voltage value corresponding to tan $(a)$ sine $(b)$ in Equation 4. The sine $(b)$ value of Equation 3 is supplied by winding 126, while the cos $(b)$ value of Equation 4 is supplied by winding 129. Hence the primary winding 231 of transformer 132 is supplied with a voltage according to sine of the sum of the angles in question, here assumed to be 3.6 degrees and 36 degrees, namely 39.6 degrees. In like manner, the primary winding 133 of transformer 134 is supplied with voltage values corresponding to cos 39.6 degrees.

In a similar manner, the sine and cosine values may be carried out to another digit by providing transformer 132 with a secondary winding 135 having no taps and with a secondary winding 136 having taps indicated at 137 in ten steps each having values according to tan 0.36 degree. Also, transformer 134 has a secondary winding 138 having no taps, and a secondary winding 139 having ten taps indicated at 140 in steps of tan 0.36 degree. As a result, winding 141 is supplied with signal values according to the sine of the sum of the angles at the input and output of transformers 132 and 134, namely, 39.96 degrees, while winding 142 is supplied with signal values according to cos 39.96 degrees. Windings 141 and 142 correspond to the quadrature windings 50 and 51 of the medium data resolver 2 and correspond to the similar windings 54 and 55 of the fine data resolver 3.

From the above explanation in connection with Equations 1 to 4 inclusive, it will be apparent how the contacts 103A of switch 103, and switches 104 and 105 serve to provide to the quadrature windings 50 and 51 (Fig. 5), sine and cosine signals representing the sum of the angles taken by these three switches. In switches 104 and 105 and also in switches 106 and 107, the distance in inches is indicated for each step of the switch, the equivalent electrical degrees of electrical wave being indicated.

It should also be noted that switch 107 corresponds to switch 105, switch 106 corresponds to switch 104, and switch portion 105A corresponds to switch portion 103A insofar as obtaining sine and cosine signals representing the sums of various angles is concerned.

Referring in further detail to the trigonometric functions computed by contacts 103A of switch 103 and by switches 104 and 105, note that switch 105 overlaps both the medium and the fine control and has a stepping magnet 185 having ten steps as indicated at 150, each step corresponding to a digital input of .01 inch. This switch has on the same level corresponding steps indicated at 151, each step being .36 degree and the steps 151 leading to the secondary winding 152 of a transformer 153 having a primary winding 154 connected to a suitable reference source such as 10 kc. as indicated. These steps 151 are in proportion to the tangent of the angle indicated, this value being supplied by the wiper lead 155 to the primary winding 156 of a transformer 157 having a secondary winding 158. Winding 158 has two sections, one of which has ten switch contacts 159 which tap off signal values proportional to the sine of the angle determined by the position of the switch 104. This switch has ten steps corresponding to distances from zero to .9 inch as indicated, the corresponding contacts, as determined by the position of the wipers shown, picking off sine values in steps of 3.6 degrees at wiper leads 160 and 171 and cos values in the same steps at wiper leads 161 and 170. The unity value of the reference voltage is supplied by winding 152 and circuit 162 to the primary winding 163 of a transformer 164 having a secondary winding 165 having a mid tap to ground as shown and with one section 166 having switch contacts 167 from which a sine value is picked off at wiper lead 171, this sine value being there indicated as negative because tapped off at one side of ground for addition to the voltage of winding 158. Winding 165 has another section 169 having taps leading to switch contacts 168 in accordance with the cosine values as indicated at its wiper lead 170.

If we let angle $(a)$ represent the angle selected by switch 105 and also let angle $(b)$ represent the angle selected by switch 104, it will be seen that the circuit corresponds to Equation 3, as the value tan $(a)$ is picked off at wiper lead 155 and supplied to primary winding 156 so that this value is multiplied with the value of cos $(b)$ picked off by wiper lead 161 to give the product term tan $(a)$ cos $(b)$, this signal value being added to the value of sin $(b)$ as picked off wiper 171. The sum of these values is supplied to the primary winding 172 of transformer 173 which is controlled by the contact banks 191 and 192, being a portion of the contacts 103A of stepping switch 103. In the same way, switches 104 and 105 respond to Equation 4, the value of cos (b) being picked off by wiper lead 170 and from this is subtracted the product of tan (a) (picked off by wiper lead 155), and sin (b) (picked off by wiper lead 160), for supply to the primary winding 174 of a transformer 175, having a secondary 196 controlled by the contacts 197 and 199 forming a part of the contacts of stepping switch 103.

Primary winding 172 is supplied with a signal equal to the sine of the sum of the decimally related angles selected by switches 104 and 105, while primary winding 174 is supplied with a signal corresponding to the cosine of the sums of those angles.

It will be apparent that the trigonometric functions performed by the contact banks 103A of switch 103 and by switch 104 respond to Equations 1 and 2. Transformer 173 has a secondary winding 190 divided into sections and connected to the banks of contacts 191 and 192 of this stepping switch so as to pick off at wiper 193 signal values proportional to the cosine, in 36 degree steps, and pick off at wiper 194 values proportional to the sine, in 36 degree steps. The wiper lead 195 thus contains signal values proportional to the product sin (a) cos (b), assuming that the angle as supplied to transformer 173 is represented by (a), while the angle selected by switch contacts 103A is represented by (b). Also, the transformer 175 has a secondary winding 196 in sections connected to a bank of switch contacts 197 to pick off at wiper 198 values proportional to the sine in 36 degree steps and to a similar bank 199 to pick off values proportional to the cosine in 36 degree steps at wiper 200.

Both sine and cosine values, with proper regard to plus or minus values, are taken from the same winding 190 of transformer 173, Fig. 5, by providing this winding as shown with fire taps, in steps of 18°, on opposite sides of its mid-tap, taking into account that the cosine of an angle equals the sine of 90° minus that angle. Certain taps are connected in multiple to the switch contacts 191, as the cosine of an angle has the same value as the cosine of 360° minus that angle. Thus the cos 0° contact of bank 191 is taken to the +90° terminal of winding 190, as cos 0°=sin 90°=1. The cos 36° and cos 324° contacts are in multiple and are taken to +54° terminal at one side of ground for the mid-tap, as cos 36°=cos 324°=sin 54°. The value of cosine 72° is the same as cos 288° and both thereof have the same value as sin 18°, and hence the third contact of switch 191 is connected in multiple with the ninth contact as shown, and they are connected to the 18° tap of winding 190. For similar reasons, the cosine 108° contact of the bank 191 is connected in multiple to the cos 252° contact and they are connected to the −18° tap; the cos 144° contact is in multiple with the cos 216° contact and they are connected to the −54° tap of winding 190. The cos 180° contact is taken to the −90° tap of winding 190 as cos 180°=−sin 90°=−1.

The contact bank 192 has certain contacts in multiple where the values of the functions are the same, the connections being made to the corresponding + or − tap on winding 190. For example, the sin 0° contact is in multiple with the sin 180° contact and both thereof are connected with the mid-tap of winding 190 which is at 0 potential. While the rest of the connections for switch 192 are obvious, another example is that the sin 36° contact is in multiple with the sin 144° contact and both thereof are connected to the sin 36° tap of the transformer. Where negative values are involved, the contacts of 192 are connected to the negative side of winding 190.

From the above explanation it is believed to be clear that the same procedure is followed in picking off the sine and cosine values from the contact banks 197 and 199, Fig. 5, certain of which are connected in multiple and to the taps on winding 196. For similar reasons, the sine coil 55 of the fine data element in Fig. 7 is controlled by the wiper lead 108 which controls the contacts 109 connected to taps on the secondary winding 110 of transformer 111 and wiper lead 112 controls contacts 113 connected to the taps on the secondary winding 114 of transformer 115, the cosine coil 54 being controlled by wiper lead 116 for contacts 117 connected to taps on winding 110, wiper lead 118 controlling contacts 119 connected to taps on the winding 114. The contacts 109, 117, 113 and 119 are banks of contacts forming the group 105A and are a part of the switch 105.

The heavy dots positioned at the ends of certain windings, for example, as shown in connection with the windings of transformers 157 and 164 in Fig. 6, indicate the relative polarities of the coils, showing that one is reversed with respect to the other in order to obtain the proper sign of the trigonometric function.

The lead 201 connected to wiper 194 contains values proportional to the product term sin (a) sin (b), the lead 202 connected to wiper 198 contains signal values proportional to cos (a) sin (b) while the lead 203 connected to wiper 200 contains values proportional to cos (a) cos (b). Lines 203 and 201 are connected on opposite sides of ground and hence the value cos (a) and cos (b) in line 203 is subtracted from the value sin (a) sin (b) in line 201. The connections thus are taken in such a way as to account for the plus and minus signs appearing in Equations 1 and 2, the coil 50 being supplied with current proportional to the sine of the sum of the angles selected by switches 103, 104 and 105, while coil 51 is supplied with signal values proportional to the cosine of the sum of those angles.

From the above explanation of the trigonometric function of the current supplied to the medium resolver 2, it will be apparent in like manner that the quadrature coil 55 of the fine data element 3 is supplied with signal values proportional to the sine of the sums of the angles selected by switches 105, 106 and 107, and quadrature coil 54 is supplied with signal values corresponding to the cosine of the sum of those angles.

The digital to analog converter of this invention may be applied to one or more additional axes of the machine. Various other modifications may be made in the invention without departing from the spirit of the following claims.

I claim:

1. A digital-to-analog converter comprising means for supplying a digital input in terms of travel of a driven element, a stepping switch, means responsive to said digital input to operate said switch to different positions, a plurality of data elements having different ranges of operation, each of said data elements having quadrature windings, a source of sine and cosine signal voltages for the quadrature windings respectively of each of said data elements controlled by said switch, and a servo amplifier and motor controlled by said data elements.

2. A digital-to-analog converter comprising an input having a group of digits of a certain value and another group of digits of another value, said values representing the extent of movement of a driven element, a data element for producing an error signal pertinent to the position of said driven element, said data element having relatively movable members one of which has quadrature windings, and a computer responsive to said input for supplying to said quadrature windings respectively signals proportional to the sine and cosine respectively of the sums of the angles pertinent to the displacement of said data element members corresponding to the input value represented by a particular digit of each of said digital groups.

3. A digital-to-analog converter comprising an input having a group of digits of a certain value in terms of linear distance of movement of a driven element, a stepping switch having ten positions and having a stepping magnet, a circuit responsive to said digital input to operate said magnet and move said switch to one of ten positions as determined by said input, a data element having quadrature windings, a transformer for supplying current to said windings, said switch having a corresponding set of ten contacts connected to said transformer in steps of electrical degrees of the electrical wave of said data element corresponding to the linear steps of said input.

4. A digital-to-analog converter comprising means for supplying a digital input as groups of digits of decimal numbers representing desired travel of a driven element, a rotary stepping switch for each of said groups of digits, each of said switches having ten positions and a stepping magnet, a circuit responsive to the digital input in each of said groups to operate one of said magnets and move its switch to any one of said positions as determined by said input, one of said switches comprising means for supplying different signal values of a range of values, and another of said switches comprising means for supplying different signal values in another range of values decimally related to and overlapping said first range, and means for operating said driven element by the combined signal values selected by a plurality of said switches.

5. A digital-to-analog converter comprising means for supplying a digital input as a group of decimal digits representing travel of a driven element, a rotary stepping switch having ten positions and a stepping magnet, a circuit responsive to said digital input to operate said magnet and move said switch to any one of said positions as determined by said input, said switch having a bank of ten contacts providing input voltages corresponding to the sine and cosine functions of travel of said driven element as designated by said input, said driven element having a data element having quadrature windings for said sine and cosine functions respectively, said data element having a cooperating winding providing an error signal.

6. A digital-to-analog converter comprising an input having groups of decimally related digits corresponding to shaft angles and a computer responsive to said input for computing and supplying signal values proportional to the sine and to the cosine of the sums of the shaft angles corresponding to the digits of said groups.

7. A digital to analog converter comprising an input having groups of decimally related digits corresponding to electrical angles related to travel of a driven element, and a computer responsive to said input for computing and supplying signal values proportional to the sine and to the cosine of the sums of electrical angles related to the travel corresponding to the digits of said groups.

References Cited in the file of this patent

UNITED STATES PATENTS

| | | |
|---|---|---|
| 2,525,124 | Gallaway et al. | Oct. 10, 1950 |
| 2,715,703 | Schuck | Aug. 18, 1955 |

OTHER REFERENCES

Electronic Engineering, June 1947, pp. 178–180.
Electronic Engineering, July 1951, pp. 256–257.
Analog Methods in Computation and Simulation, Soraka, 1954, p. 144, Fig. 4. 16a.